United States Patent [19]
Michihata et al.

[11] Patent Number: 6,008,940
[45] Date of Patent: Dec. 28, 1999

[54] PROTECTIVE FILM OF POLARIZING PLATE

[75] Inventors: Isamu Michihata; Koichi Nagayasu; Toru Kobayashi; Masaji Nara, all of Hino, Japan

[73] Assignee: Konica Corporation, Tokyo, Japan

[21] Appl. No.: 08/808,398

[22] Filed: Feb. 28, 1997

[30] Foreign Application Priority Data

Mar. 15, 1996 [JP] Japan ................................ 8-059290

[51] Int. Cl.$^6$ .............................. G02B 5/02; G02B 5/30
[52] U.S. Cl. ...................... 359/483; 359/599; 359/601
[58] Field of Search .................... 359/601, 483, 359/485, 582, 599, 493; 349/96, 112, 137

[56] References Cited

U.S. PATENT DOCUMENTS

| | | | |
|---|---|---|---|
| 3,398,018 | 8/1968 | Walters | 359/601 |
| 4,895,767 | 1/1990 | Mori et al. | 359/601 |
| 4,945,282 | 7/1990 | Kawamura et al. | 313/479 |
| 5,189,337 | 2/1993 | Endo et al. | 359/601 |
| 5,709,922 | 1/1998 | Ono et al. | 359/601 |
| 5,742,118 | 4/1998 | Endo et al. | 359/601 |
| 5,759,643 | 6/1998 | Miyashita et al. | 428/1 |
| 5,770,306 | 6/1998 | Suzuki et al. | 428/328 |
| 5,773,126 | 6/1998 | Noritake et al. | 359/483 |

*Primary Examiner*—Cassandra Spyrou
*Assistant Examiner*—John Juba, Jr.
*Attorney, Agent, or Firm*—Frishauf, Holtz, Goodman, Langer & Chick, P.C.

[57] ABSTRACT

A protective film for use with a polarizing plate has a support carrying a glare-proof layer. The glare-proof layer is a resin with coarse particles having an average particle size of 0.25 to 10 μm, and fine particles having an average particle size of 0.1 μm or less and a refractive index of 1.40 to 1.60, embedded in it.

17 Claims, 1 Drawing Sheet

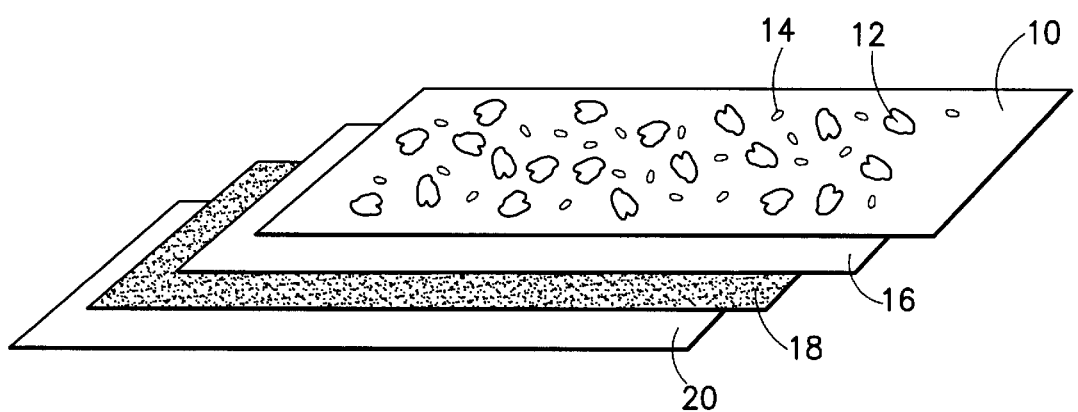

PROTECTIVE FILM OF POLARIZING PLATE

FIELD OF THE INVENTION

The present invention relates to a protective film of a polarizing plate and in particular to a protective film of a polarizing plate exhibiting effective glare-proof and excellent transmission visibility.

BACKGROUND OF THE INVENTION

Triacetyl cellulose type resins have been used as a protective film of a polarizing plate. Recently, polarizing plates are used for a variety of applications under various environments and in response thereto, a protective film for polarizing plates with further added value in use has been desired. As one of the added values is cited glare-proofing to prevent glare of the surface of the image plane of liquid crystal. For example, there is employed a means for glare-proofing, in which fine particles such as silica are contained in the outermost surface of the protective film of the polarizing plate.

SUMMARY OF THE INVENTION

When using a protective film of a polarizing plate, in the outermost surface thereof, fine particles such as silica to prevent glare of the surface of the image plane of the liquid crystal, it was proved that glare-proof effect was exhibited but transmission visibility of the polarizing plate was markedly reduced due to the presence of the fine particles. Accordingly, an object of the present invention is to find a technique of enhancing a glare-proofing function and providing excellent transmission visibility of the produced polarizing plate.

The object of the present invention is accomplished by (1) a protective film of a polarizing plate, characterized in that said protective film comprises a support having a glare-proof layer comprising coarse particles having an average particle size of 0.25 to 10 μm, and fine particles having an average particle size of 0.1 μm or less and a refractive index of 1.40 to 1.60; and (2) a polarizing plate comprising a polarizing film containing a polarizer and provided thereon a protective film which comprises a support having thereon a glare-proof layer, wherein said glare-proof layer comprises coarse particles having an average particle size of 0.25 to 10 μm, and fine particles having an average particle size of 0.1 μm or less and a refractive index of 1.40 to 1.60.

BRIEF DESCRIPTION OF THE DRAWING

The drawing shows a polarizing plate carrying a glare-proof layer in accordance with the invention.

DETAILED DESCRIPTION OF THE INVENTION

Referring to the drawing, a polarizing film 20 is shown carrying a glare-proof layer 10 with both coarse particles 12 and fine particles 14. The glare-proof layer 10 is carried on support 16 which in turn is carried on the polarizing film with an adhesion facilitating layer 18 disposed therebetween.

The coarse particles 12 having an average size of 0.25 to 10 μm are those which are allowed to be present in the vicinity of the outermost surface of the protective film 10 of the polarizing plate 20, and thereby glare-proof of the surface of the picture area of liquid crystal being achieved. The average particle size thereof is within the range of 0.25 to 10 μm.

The coarse particles 12 include inorganic particles and organic particles. Examples of the inorganic particles used in the invention include silicon oxide, titanium oxide, aluminium oxide, zinc oxide, tin oxide, calcium carbonate, barium sulfate, talc, kaolin, and calcium sulfate. As to the organic particles, poly(metha)acrylate type resin, silicone type resin, polystyrene type resin, polycarbonate type resin, acrylstyrene type resin, benzoguanamine type resin, melamine type resin, polyolefin type resin, polyester type resin, polyamide type resin, polyimide type resin, and polyfluoroethylene type resin are usable.

Among these, silicon oxide such as silica is particularly preferred to effectively achieve the glare-proof aimed in the invention. Among synthetic amorphous silica of the silicon oxide is preferred fine-powdered, water containing silicate prepared through a wet process. The thus prepared silicate was proved to be markedly effective in lowering luster. The wet process is a method in which sodium silicate is allowed to react with a mineral acid and salt in an aqueous medium. The coarse particles which are commercially available include, for example, Silicia produced by Fuji Silicia Co., ltd. and Nipsil E produced by Nihon Silica Co., ltd.

The average particle size of the coarse particles 12 was determined as follows. At first, a cross-sectioned photomicrograph of a sample containing the particles was taken and the diameter was measured with respect to 1,000 particles taken in the photograph, by using an image processing device, LUZEX-III produced by NIRECO Co., ltd. to obtain an average value thereof.

The fine particles 14 having an average particle size of 0.1 μm or less and an refractive index of 1.40 to 1.60 are allowed to be present in the vicinity of the outermost surface of the protective layer of the polarizing plate, whereby glare-proof by the coarse particles 12 is effected, and further providing superior transmission visibility to the protective film of the polarizing plate.

The fine particles 14 include inorganic particles and organic particles. Examples of the inorganic particles usable in the invention include silicon oxide, titanium oxide, aluminum oxide, zinc oxide, tin oxide, calcium carbonate, barium sulfate, talc, kaolin, and calcium sulfate. As to the organic particles, poly(metha)acrylate type resin, silicone type resin, polystyrene type resin, polycarbonate type resin, acrylstyrene type resin, benzoguanamine type resin, melamine type resin, polyolefin type resin, polyester type resin, polyamide type resin, polyimide type resin, and polyfluoroethylene type resin are usable.

Among these, silicon oxide such as silica is particularly preferred to achieve the glare-proof and transmission visibility aimed in the invention. As the fine silicon oxide particles is preferred silica prepared through a dry process and in particular, anhydrous silicate prepared by a combustion method is preferred. The thus prepared silicate was proved to be markedly effective in enhancement of transmission visibility. The dry process is a process in which fine-powdered, anhydrous silicate particles are formed at a high temperature of 1,000° C. or higher. In the process, vaporized silicon tetrachloride is mixed with hydrogen and the mixture is subjected to combustion at 1,000 to 1,200° C. under open air to obtain super fine particles. Commercially available particles, for example, f include Aerosil produced by Nihon Aerosil Co., ltd. The afore-described wet process and the above dry process are both referred to e.g., "Filler Katsuyo-Jiten" (Practical Handbook of Filler) pages 65–66, published by Taisei-sha.

Examples of the fine particles 14 having an refractive index of 1.40 to 1.60 include polymethyl methaacrylate fine particles having a refractive index of 1.50; silica fine particles having a refractive index of 1.46; polyacryl fine particles having a refractive index of 1.49; polystyrene fine particles having a refractive index of 1.50; polyvinyl chloride fine particles 14 having a refractive index of 1.54; polycarbonate fine particles 14 having a refractive index of 1.58; alumina fine particles 14 having a refractive index of 1.56, etc.

The average size of the fine particles 14 was determined in the following manner. At first, a sample of the invention containing the fine particles 14 was enveloped with epoxy resin, extremely thinly-sliced section was prepared by a microtome, and cross-sectioned transmission electronmicrograph (TEM) thereof was taken. The diameter was measured with respect to 1,000 particles taken in the photograph to obtain an average value thereof.

The glare-proof layer 10 according to the invention plays a role of preventing light of such as fluorescent lamp from being reflected in the image plane to improve clearness of liquid crystal display provided with a polarizing plate, and containing material capable of irregularly reflecting the light.

The polarizing plate according to the invention comprises a polarizing film 20 containing a polarizer and laminated thereto a protective film. In addition thereto, a phase plate may be included. The protective film is laminated to the polarizing film 20 with an adhesive. As the adhesive, polyvinyl alcohol type adhesives such as polyvinyl alcohol and polyvinyl butyral, and vinyl type latexes such as butyl alcohol are usable. The polarizing film 20 which is a main constituting element of the polarizing plate is an element capable of allowing light having a wavefront polarized in a direction to pass through. A representative polarizing film 20 is a polyvinyl alcohol type polarizing film 20, including polyvinyl alcohol type film dyed with iodine or a dichroic dye. One which is prepared by uniaxial-stretching and dying or vice versa and preferably subjecting to durability treatment with a boron compound is preferred.

A preferred embodiment of the present invention is a protective film of a polarizing plate having a glare-proof layer comprising coarse particles 12 having an average particle size of 0.25 to 10 $\mu$m and hydrophilic fine particles 14 having an average particle size of 0.1 $\mu$m or less and a refractive index of 1.40 to 1.60. The hydrophilic fine particles 14 described above are referred to as fine particles 14 having hydrophilic surface. Alternatively, the hydrophilic fine particles are referred to as those having high, adsorbed moisture content and concretely, having 0.5% or more of a moisture content at 80% R.H. and 25° C.

According to the invention, such hydrophilic fine particles are preferably used, and those having the moisture content of 1.5% or more are more preferred in terms of superiority in transmission visibility. The moisture content can generally be measured by using a Karl-Fischer type moisture meter. According to the invention, the moisture content of the fine particles 14 was measured by using a micro-moisture meter, CA-06 and moisture-vaporizing apparatus, VA-06 (both produced by Mitsubishi Chemical Corp.

In cases where fine polymethyl methaacrylate particles or fine titanium oxide particles are used as the hydrophilic fine particles, hydrophilicity thereof can be provided with a OH group or by treating their surface with a metal oxide such as $Al_2O_3$. As hydrophilic silica particles are employed those having a high density of silanol group.

Further, another preferred embodiment of the present invention is a protective film of a polarizing plate having a glare-proof layer 10 with a thickness of 0.5 to 5.0 $\mu$m, and comprising coarse silicon oxide particles 12 having an average particle size of 1.1 to 2.0 times the layer thickness and fine silicon oxide particles having an average particle size of 0.005 to 0.1 $\mu$m; and thereby, the protective film of a polarizing plate exhibiting sufficient glare-proof effect and superior transmission visibility can be obtained, and by the use thereof, the polarizing plate superior in preventing occurrence of sparkle can be provided. The coarse silicon oxide particles 12 are particles comprised of silicon oxide such as silica, playing a role of preventing glare of the surface of liquid crystal imaging plane. The fine silicon oxide particles 14 are fine particles 14 comprised of silicon oxide such as silica, which are present together with the coarse silicon oxide particles, preventing glare of the surface of liquid crystal imaging plane and providing a polarizing plate exhibiting superior transmission visibility.

The average particle size of the fine silicon oxide particles is defined similarly to the case of the fine particles having an average particle size of 0.1 $\mu$m or less, as afore-described. The fine silicon oxide particles 14 are preferably hydrophilic ones in terms of superiority in transmission visibility. The hydrophilic fine silicon oxide particles 14 are those having a high density of a silanol group on the surface and a high moisture-absorption content, i.e.,the moisture-absorption content at 80% R.H. of 0.5% or more and preferably, 1.5% or more. The average particle size thereof is preferably 0.008 to 0.015 $\mu$m.

The glare-proof layer 10 with a thickness of 0.5 to 5.0 $\mu$m, as above-described is a layer comprising coarse silicon oxide particles and fine silicon oxide particles, and having function to prevent glare of the surface of liquid crystal imaging plane.

The glare-proof layer 10 may be any one which comprises coarse silicon oxide particles 12 and fine silicon oxide particles 14 dispersed in a binder such as diacetyl cellulose, and having a desired thickness. It is preferred to use an actinic ray-hardenable resin as a binder. A layer containing the actinic ray-hardenable resin is cured by exposing to actinic ray after coating to form a hardened resin layer containing coarse silicon oxide particles and fine silicon oxide particles. Thus, a glare-proofing clear hard layer obtained by the use of the actinic ray-hardenable resin is preferred in terms of capability of providing further additional functions to one layer and enhancing mechanical strength of the surface of the polarizing plate.

The actinic ray-hardenable resin used in the invention is a resin capable of being hardened upon exposure to ultraviolet ray or electron beam through cross-linking reaction. As representative examples of the actinic ray-hardenable resin are cited an ultraviolet ray-hardenable resin and electron beam-hardenable resin, and a resin capable of being hardened upon exposure to an actinic ray other than ultraviolet ray and electron beam may be usable. Examples of the ultraviolet ray-hardenable resin include ultraviolet ray-hardenable polyester-acrylate type resins, ultraviolet ray-hardenable acrylurethane type resins, ultraviolet ray-hardenable acrylate type resins, ultraviolet ray-hardenable methaacrylate type resins, ultraviolet ray-hardenable polyester-acrylate type resins and ultraviolet ray-hardenable polyol-acrylate type resins.

Ultraviolet ray-hardenable polyol-acrylate type resins usable in the invention are photopolymerizable monomers/oligomer, such as trimethylolpropane-triacrylate, di-trimethylolpropane-tetraacrylate, pentaerythritol-triacrylate, pentaerythritol-tetraacrylate, di-pentaerythritol-pentaacrylate, di-pentaerythritol-hexaacrylate and alkyl-modified di-pentaerythritol-pentaacrylate. These polyol-acrylate type resins are highly curable and markedly hardenable, characterized in that they are little in hardening shrinkage, low in odor and toxicity and high in safety.

The ultraviolet ray-hardenable polyol-acrylate type resin may usable in combination with another type ultraviolet ray-hardenable resin, such as ultraviolet ray-hardenable epoxy type resin. Hardened coating layer of acrylate type resin is large in curling due to its hardening shrinkage and interfere with handling. Epoxy type resins are small in hardening shrinkage and curling of the hardened coating layer. The ultraviolet ray-hardenable epoxy type resin is comprised of a compound containing at least two epoxy groups in the molecule, containing a cationic polymerization initiator and being capable of curing reaction upon exposure to ultraviolet ray.

Electron beam-hardenable resins usable in the invention are preferably those having an acrylate type functional group, such as a relatively low polymeric polyester resin, polyether resin, acryl resin, epoxy resin, urethane resin, alkyd resin, spiroacetal resin, polybutadiene resin and polythiol-polyene resin.

To achieve markedly and easily effects of the invention, the ultraviolet ray-hardenable resin is preferably used.

The actinic ray-hardenable resin relating to the invention is hardened on exposure to electron beams or ultraviolet rays. In the case of electron beam hardening, there can be employed electron beam emitted from various types of electron beam accelerators such as Cockcroft-Walton type, van de Graaff type, resonance transformer type, insulated core transformer type, linear type, dynamitron type and high frequency type and having an energy of 50 to 1,000 KeV, preferably 100 to 300 KeV. In the case of ultraviolet ray hardening, there can be employed ultraviolet rays emitted from lamps such as ultra-high pressure UV lamp, high pressure UV lamp, low pressure UV lamp, carbon arc, xenon arc, metal halide lamp.

According to the invention, the layer thickness can be measure by observing the section of the protective film, based on its electronmicrograph. Thus, observed values with respect to ten different portions are averaged out to obtain the layer thickness. The thickness of the glare-proof layer 10 relating to the invention is preferably 0.5 to 5.0 $\mu$m and more preferably, 2.0 to 4.0 $\mu$m.

As to the average particle size of coarse silicon oxide particles, the expression, "an average particle size of 1.1 to 2.0 times the layer thickness" means that, in case of the layer thickness of 0.5 $\mu$m, for example, the average particle size of silicon particles is within the range of 0.55 to 1.0 $\mu$m; and in case of the layer thickness of 5.0 $\mu$m, the average particle size is 5.5 to 10.0 $\mu$m.

The glare-proof layer 10 according to the invention is provided on a transparent resin film 16. The transparent resin film may be any one which can be used as a protective film of a polarizing plate. Examples thereof include a cellulose acetate film, polyester film, polycarbonate film, norbornen type resin film, polyacrylate film and polysulfon resin film. Among these are preferred cellulose acetate film such as cellulose triacetate and polycarbonate type resin film in terms of durability and mechanical strength.

The cellulose acetate resin film usable in the invention may be any one known in the art. Combined acetic acid of the cellulose acetate (i.e., weight percentage of acetic acid bonded to the cellulose) is preferably 50 to 62% and more preferably 56 to 62%. The weight-average molecular weight of the cellulose acetate is preferably 70,000 to 120,000 and more preferably, 80,000 to 100,000.

The cellulose triacetate may partially be esterified with an fatty acid other than acetic acid, such as propionic acid and butylic acid, as far as the combined acetic acid amount is satisfied as above-described. As far as the combined acetic acid is satisfied in total amount, cellulose esters such as cellulose propionate or cellulose butyrate may be contained.

The cellulose triacetate film used in a protective film of a polarizing plate generally contains a plasticizer. Examples thereof include phosphates such as triphenyl phosphate and tricresyl phosphate and phthalates such as diethyl phthalate and dimethyl phthalate.

As polycarbonate resin usable in the invention, aromatic carbonates are preferred in terms of their chemical and physical properties, and in particular, bisphenol A type polycarbonate is preferred. Among them, bisphenol A type derivatives, in which a benzene ring, cyclohexane ring or aliphatic hydrocarbon group is introduced in the phenol A moiety, are more preferable. In particular is preferred a polycarbonate obtained by making use of the derivative in which at least one of these group is introduced asymmetrically with respect to the central carbon atom. For example, a polycarbonate obtained by making use of a carbonate such that two methyl groups attached to the central carbon atom of bisphenol A are replaced by phenyl group or a hydrogen atom of each benzene ring of bisphenol A is replaced by a substituent such as methyl or phenyl group, asymmetrically with respect to the central carbon atom is preferably used. Concretely are those obtained, through a phosgene method or transesterification method, from 4,4'-dihydroxy-diphenylalkane or its halogen substituted derivative, such as 4,4'-dihydroxy-diphenylmethane, 4,4'-dihydroxy-diphenylethane or 4,4,'-dihydroxy-diphenylbutane.

The polycarbonate resin may be used in the form of a mixture with other transparent resin such as polystyrene type resin, methyl methaacrylate type resin or cellulose acetate type resin. At least one side of a cellulose acetate type film may be laminated with the polycarbonate resin. A method of preparing the polycarbonate type resin film usable in the invention is not specifically limited. Films prepared by any of the extrusion method, solvent-casting method and calendering method may be used. Either of a uniaxially stretched film and biaxially stretched film may be used. The solvent-casting film is preferred in view of superiority in surface fineness and optical isotropy.

The polycarbonate resin film used in the invention has a glass transition point of 110° C. or higher (preferably, 120° C. or higher) and water absorption of 0.3% or less (preferably, 0.2% or less), wherein the water content was measured after being dipped in water at 23° C. for 24 hrs.

The protective film of the polarizing plate may be subjected to surface treatments, such as adhesion-facilitating treatment, anti-blocking treatment, anti-curling treatment, clear-hardening treatment, anti-reflection treatment and anti-static treatment. Exemplarily are cited embodiments such that (i) a glare-proof layer (e.g., clear-hard treated layer containing particles and fine particles relating to the invention) is provided on one side of the transparent resin film (b-side) and the other side (a-side) is subjected to adhesion-facilitating treatment (i.e., treatment for enhancement of adhesion of the transparent resin film to a polarizing membrane); (ii) the b-side of the transparent resin film is subjected to antistatic treatment and further thereon, a glare-proof layer is provided, and the a-side is subjected to the adhesion-facilitating treatment; (iii) a glare-proof layer is provided on the b-side of the transparent resin film and the a-side is subjected to anticurling treatment.

The adhesion-facilitating treatment is to provide function for facilitating adhesion of the protective film of the polarizing plate to an adjacent layer such as a polarizing membrane. The adhesion-facilitating treatment can be conducted by surface-activating treatment such as a corona discharge treatment, flame treatment, UV treatment, high frequency treatment, glow discharge treatment, active plasma treatment, laser treatment and ozone oxidation treatment; or by providing an adhesion-facilitating layer 18. Among these treatments, it is preferred to provide the adhesion-facilitating layer 18.

As an embodiment of the adhesion-facilitating layer 18, a layer containing a polymer compound having —COOM group (M represents a hydrogen atom or a cation).

Preferably, the layer containing the polymer compound having —COOM group is provided on the side of the protective film, and adjoining thereto and on the side of a polarizing membrane is provided a layer mainly containing a hydrophilic polymer compound. In this case, examples of the polymer compound containing —COOM group include a COOM group-containing styrene-maleic acid copolymer and COOM group-containing vinyl acetate-maleic acid copolymer. Particularly, COOM group-containing vinyl acetate-maleic acid copolymer is preferred in terms of the object of the present invention. The polymer compound may be used singly or in combination thereof. A weight-averaged molecular weight thereof is preferably 500 to 500,000. Examples of the polymer compound containing —COOM group are shown as below, but the present invention is not limited thereto.

Exemplified Compound

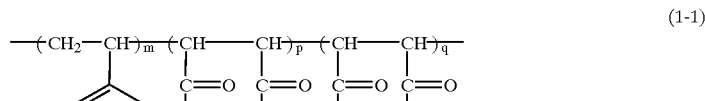

(1-1)

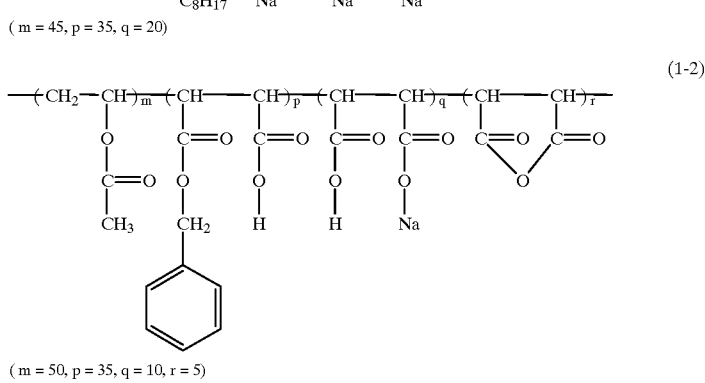

(1-2)

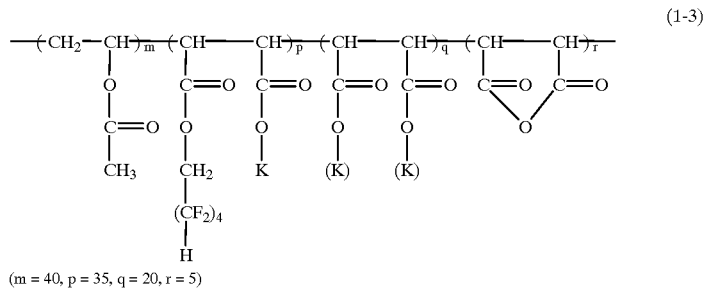

(1-3)

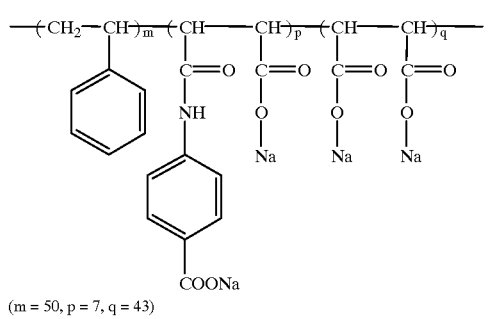
(1-4)

(m = 50, p = 7, q = 43)

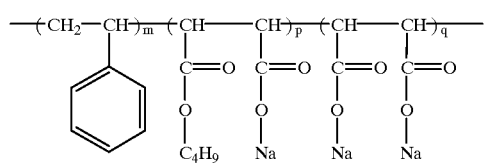
(1-5)

(m = 50, p = 2, q = 48)

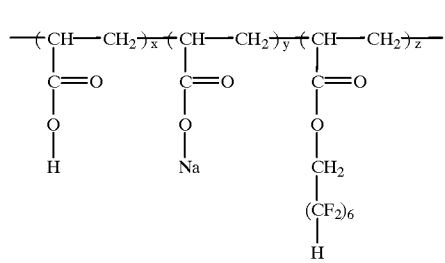
(1-6)

(x = 10, y = 60, z = 30)

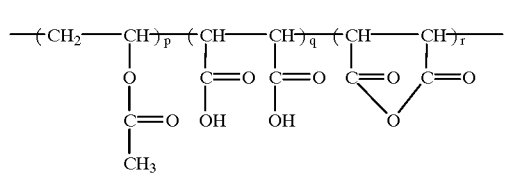
(1-7)

(p = 50, q = 25, r = 25)

Examples of the hydrophilic polymer compound include hydrophilic cellulose derivatives (e.g., methyl cellulose, carboxymethyl cellulose, hydroxycellulose, etc.); polyvinyl alcohol derivatives (e.g., polyvinyl alcohol, vinyl acetate-vinyl alcohol copolymer, polyvinyl acetal, polyvinyl formal, polyvinyl benzal, etc.); natural polymer compound (e.g., gelatin, casein, arabic gum, etc.); hydrophilic polyester derivatives (e.g., partially sulfonated polyethylene terephthalate); polyvinyl derivatives (e.g., poly-N-vinyl pyrrolidone, polyacrylamide, polyvinyl indazole, polyvinyl pyrazole, etc.). These compound may be used singly or in combination thereof.

The antiblocking treatment applicable in the invention is to provide ease of handling of a transparent resin film. Thus, it provides functions of preventing winding distortion occurred when winding up a transparent resin film and making it easy to recover the winding distortion.

The anticurling treatment is to provide function of curling so as to be applied-side-in. Thus, when one side of the transparent resin film is subjected to a surface treatment or both sides thereof are subjected to surface treatment to different extents or in different manners, the anticurling treatment is to prevent curling in the direction of the side being inside. One embodiment thereof is that the adhesion-facilitating layer is coated on one side of the transparent resin film and to the opposite side is applied an anticurling treatment. A concrete method for anticurling includes one by solvent-coating or coating a transparent resin layer. In the method by solvent-coating, there is coated a composition containing a solvent capable of dissolving or a transparent resin film used as a protective film of a polarizing plate. The solvent is used singly or in combination, depending on an extent of curling of the transparent resin film and the kind thereof. In addition, a clear-hardening treatment and anti-static treatment also displayed anticurling effects.

The clear-hardening treatment is to achieve clear hardening function, as afore-described as one of binders in glare-proofing treatments. It is preferably to coat a actinic ray-hardenable resin layer.

The antistatic treatment applicable in the invention is to provide function of preventing the resin film from charging. One embodiment thereof is to provide a layer containing an ionic conductive material or conductive fine particles. The ionic conductive material is one which is electrically conductive and contains ions as an electric carrier. An example thereof is an ionic polymer compound. The ionic polymer compound includes anionic polymer compounds described in examined and published Japanese Patents 49-23828, 49-23827 and 47-28937; ionen type polymer containing a dissociative group in the main chain described in Japanese Patents 55-734, 57-18175, 57-18176, 57-56059, 59-14735 and unexamined and published Japanese Patent Application (hereinafter denoted as "JP-A") 50-54672; and cationic pendant type polymer containing a cationic dissociative group in the side chain described in Japanese Patents 53-13223, 53-45231, 55-145783, 55-65950, 55-67746, 57-15376, 57-11342, 57-19735, 58-56858, 61-27853 and JP-A 61-27853 and 62-9346. An example of the conductive fine particles is conductive metal oxide. The metal oxide is preferably ZnO, $TiO_2$, $SnO_2$, $Al_2O_3$, $In_2O_3$, $SiO_2$, MgO, BaO, $MoO_2$, $V_2O_5$ or complex oxide thereof; and ZnO, $TiO_2$ or $SnO_2$ is particularly preferred. As an example containing a hetero atom, addition of Al or In to ZnO, addition of Nb or Ta to $TiO_2$, and addition of Sb, Nb or halogen element to $SnO_2$ is effective. The addition amount of the hetero atom is preferably 0.01 to 25 mol %, more preferably, 0.1 to 15 mol %. The volume resistivity of these conductive metal oxide powder is $10^7$ Ωcm or less, preferably, $10^5$ Ωcm or less. It is preferred that the powder having a specific structure with a primary particle diameter of 100 Å to 0.2 μm and a long-diameter of high-order structure of 300 Å to 6 μm is contained in a conductive layer, in amount of 0.01 to 20% by volume.

EXAMPLES

Embodiments of the invention are exemplarily explained but the invention is not limited thereto.

Preparation of UV Ray-hardenable Resin Composition A

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 1.8 μm) | 2.5 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenizer produced by Gaulin Corp.).

Coating solution of adhesion-facilitating layer (a):

| | |
|---|---|
| Lower layer solution | |
| Exemplified compound (1-1) | 0.5 g |
| Acetone | 60 ml |
| Ethyl acetate | 30 ml |
| Toluene | 10 ml |
| Upper layer solution | |
| Polyvinyl alcohol (Gosenol NH-26, produced by Nihon Gosei Kagakukogyo) | 0.5 g |
| Saponin (product by Merck) | 0.03 g |
| Water | 50 ml |
| Methanol | 50 ml |

Coating solution of adhesion-facilitating layer (b):

| | |
|---|---|
| Lower layer solution | |
| Exemplified compound (1-1) | 0.5 g |
| Acetone | 60 ml |
| Ethyl acetate | 30 ml |
| Isopropyl alcohol | 10 ml |
| Upper layer solution | |
| the same as that of the upper layer solution of (a) | |

Preparation of UV Ray-hardenable Resin Composition B

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 4.5 μm) | 2.5 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenizer produced by Gaulin Corp.).

Preparation of UV Ray-hardenable Resin Composition C

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 1.8 μm) | 2.5 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition D

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 0.23 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition E

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 0.38 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition F

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 1.0 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition G

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 3.75 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition H

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 4.5 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenized produced by Gaulin Corp.).

Preparation of UV Ray-hardenable Resin Composition I

| | |
|---|---|
| Dipentaerythritol hexaacrylate monomer | 50 parts (by weight) |
| Dipentaerythritol hexaacrylate dimer | 20 parts |
| Dipentaerythritol hexaacrylate trimer or more | 20 parts |
| 1,4-butanediol diglycidyl ether | 10 parts |
| Diethoxybenzophenone UV initiator | 2 parts |
| Aromatic sulfonium type UV initiator | 0.5 parts |
| Fluoro-surfactant | 1 part |
| Silica (av. primary particle size: 1.88 μm) | 2 parts |
| Hydrophilic silica (av. particle size: 0.01 μm) | 2 parts |
| Methyl ethyl ketone | 50 parts |
| Ethyl acetate | 50 parts |
| Isopropyl alcohol | 50 parts |

The above composition was mixed by high-speed stirring machine (TK homo-mixer produced by Tokushu Kika Kogyo Co., ltd.) and then dispersed using a collision type disperser (Manton-Gaulin homogenizer produced by Gaulin Corp.).

Example 1

Using above coating solutions prepared, samples were prepared according to the following manner.

Preparation of Inventive Sample 1-1

Polycarbonate resin (viscosity-averaged molecular weight of 40,000; bisphenol A type) of 100 parts by weight, 2-(2'-hydroxy-3',5'-di-t-butylphenyl)benzotriazole of 1.0 part by weight, methylene chloride of 430 parts by weight and methanol of 90 parts by weight were introduced in a sealed vessel and completely dissolved with stirring at 80° C. under pressure. The resulting solution was filtered, then uniformly cast on a stainless band at 33° C. and dried for 5 min. After being dried and peeled off from the stainless band, drying was completed with transporting with a number of rollers to obtain polycarbonate film with a thickness of 50 μm. In this case, a side in contact with the stainless band is denoted as "b-side" and the opposite side is denoted as "a-side".

On the b-side of the polycarbonate film, UV ray-hardenable resin composition A was coated so as to have a dry thickness of 3.0 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m² and dried at 100° C. for 5 min. to obtain an inventive sample 1-1.

Preparation of Inventive Sample 1-2

Inventive sample 1-2 was prepared in the same manner as the inventive sample 1-1, except that hydrophilic silica (average particle size of 0.01 μm) of 2 parts by weight used in the UV ray-hardenable resin composition A was replaced by hydrophobic silica (average particle size of 0.01 μm) of 2 parts by weight.

Preparation of Inventive Sample 1-3

Inventive sample 1-3 was prepared in the same manner as the inventive sample 1-1, except that hydrophilic silica (average particle size of 0.01 μm) of 2 parts by weight used in the UV ray-hardenable resin composition A was replaced by hydrophilic polymethyl methacrylate (average particle size of 0.01 μm) of 2 parts by weight.

Preparation of Inventive Sample 1-4

Inventive sample 1-4 was prepared in the same manner as the inventive sample 1-1, except that hydrophilic silica (average particle size of 0.01 μm) of 2 parts by weight used in the UV ray-hardenable resin composition A was replaced by hydrophobic polymethyl methacrylate (average particle size of 0.01 μm) of 2 parts by weight.

Preparation of Inventive Sample 1-5

Inventive sample 1-5 was prepared in the same manner as the inventive sample 1-1, except that silica (average particle size of 1.8 μm) of 2.5 parts by weight used in the UV ray-hardenable resin composition A was replaced by polymethyl methacrylate (average particle size of 3.5 μm) of 2.5 parts by weight.

Preparation of Inventive Sample 1-6

Cellulose triacetate (the acetic acid-bonding amount of 61.0%) of 100 parts by weight, triphenyl phosphate of 9 parts by weight, 2-(2'-hydroxy-3',5'-di-t-butylphenyl) benzotriazole of 8 part by weight, methylene chloride of 430 parts by weight and methanol of 90 parts by weight were introduced in a sealed vessel and completely dissolved with stirring at 80° C. under pressure. The resulting solution was filtered, then uniformly cast on a stainless band at 33° C. and dried for 5 min. After being dried and peeled off from the stainless band, drying was completed with transporting with a number of rollers to obtain cellulose triacetate film with a thickness of 80 μm. In this case, a side in contact with the stainless band is denoted as "b-side" and the opposite side is denoted as "a-side".

Inventive sample 1-6 was prepared in the same manner as the inventive sample 1-1, except that the polycarbonate film used in sample 1 was replaced by the cellulose triacetate film and a coating solution of the adhesion-facilitating layer (b) was coated on the a-side.

Preparation of Inventive Sample 1-7

Using the polycarbonate film with a thickness of 80 mm used in sample 1, UV ray-hardenable resin composition B was coated on the b-side of the film so as to have a dry thickness of 8.0 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m² and dried at 100° C. for 5 min. to obtain an inventive sample 1-7.

Preparation of Comparative Sample 1-1

Comparative sample 1-1 was prepared in the same manner as the inventive sample 1-1, except that hydrophilic silica (average particle size of 0.01 μm) of 2 parts by weight used in the UV ray-hardenable resin composition A was replaced by hydrophilic silica (average particle size of 0.25 μm) of 2 parts by weight.

Preparation of Comparative Sample 1-2

Comparative sample 1-2 was prepared in the same manner as the inventive sample 1-1, except that silica (average particle size of 1.8 μm) of 2.5 parts by weight used in the UV ray-hardenable resin composition A was replaced by polymethyl methacrylate (average particle size of 3.5 μm) of 2.5 parts by weight, and hydrophilic silica (average particle size of 0.01 mm) of 2 parts by weight was replaced by hydrophilic silica (average particle size of 0.25 μm) of 2 parts by weight.

Preparation of Comparative Sample 1-3

Comparative sample 1-3 was prepared in the same manner as the inventive sample 1, except that hydrophilic silica (average particle size of 0.01 μm) of 2 parts by weight used in the UV ray-hardenable resin composition A was replaced by hydrophilic titanium oxide (average particle size of 0.03 μm) of 2 parts by weight.

Preparation of Comparative Sample 1-4

Comparative sample 1-4 was prepared in the same manner as the inventive sample 1-1, except that silica (average particle size of 1.8 μm) of 2.5 parts by weight used in the UV ray-hardenable resin composition A was replaced by silica (average particle size of 0.2 μm) of 2.5 parts by weight.

Preparation of Comparative Sample 1-5

Using the polycarbonate film with a thickness of 80 mm used in sample 1, UV ray-hardenable resin composition C was coated on the b-side of the film so as to have a dry thickness of 3.0 μm and dried at 80° C. for 5 min. Subsequently, the coat was exposed to UV light emitted from a high pressure UV lamp at a distance of 10 cm apart for 4 sec. to form UV-hardened resin layer C. Next, on the a-side, the lower layer solution (1) and upper layer solution (2) of the adhesion-facilitating layer (a) were each coated in this order in a coating amount of 20 ml/m² and dried at 100° C. for 5 min. to obtain an comparative sample 1-5.

Thus-prepared inventive samples 1-1 through 1-7 and comparative samples 1-1 through 1-5 were each evaluated with respect to their performance, according to the following manner.

Evaluation of glare-proof (measurement of glossiness)

Protective film samples of a polarizing plate were measured with respect to glossiness to evaluate their glare-proofing effect, according to the method described in JIS K7105 by using a measuring instrument T-2600DA produced by Tokyo Denshoku Kogyo (60 degree glossiness). Results thereof are shown in Table 1.

Evaluation of Transmission Visibility

Samples were measured with respect to transmission visibility, according to the method described in JIS K-7105-1981 by using an image clarity-measuring machine, ICM-1DO produced by Suga Shikenki. Results thereof are shown in Table 1. Transmission visibility (%) was shown as a total value of four types of optical wedge with widths of 0.125 mm, 0.5 mm, 1.0 mm and 2.0 mm.

TABLE 1

| Sample No. | Layer thickness (μm) | Coarse particles Av.size (μm) | Coarse particles material | Fine particles Av.size (μm) | Fine particles material | Fine particles Refractive index | surface | Glossiness | Transmission visibility | Film support resin |
|---|---|---|---|---|---|---|---|---|---|---|
| 1-1(Inv.) | 3.0 | 3.5 | Silica | 0.01 | Silica | 1.46 | a* | 62.9 | 82.2 | PC |
| 1-2(Inv.) | 3.0 | 3.5 | Silica | 0.01 | Silica | 1.46 | b | 63.1 | 70.5 | PC |
| 1-3(Inv.) | 3.0 | 3.5 | Silica | 0.01 | TiO$_2$ | 1.50 | a | 64.2 | 62.3 | PC |
| 1-4(Inv.) | 3.0 | 3.5 | Silica | 0.01 | TiO$_2$ | 1.50 | b | 63.5 | 60.1 | PC |
| 1-5(Inv.) | 3.0 | 3.5 | PMMA | 0.01 | Silica | 1.46 | a | 48.7 | 74.9 | PC |
| 1-6(Inv.) | 3.0 | 3.5 | Silica | 0.01 | Silica | 1.46 | a | 62.8 | 82.5 | TAC |
| 1-7(Inv.) | 8.0 | 9.0 | Silica | 0.01 | Silica | 1.46 | a | 65.4 | 69.1 | PC |
| 1-1(Comp.) | 3.0 | 3.5 | Silica | 0.25 | Silica | 1.46 | a | 58.7 | 24.6 | PC |
| 1-2(Comp.) | 3.0 | 3.5 | PMMA | 0.25 | Silica | 1.46 | a | 42.6 | 19.4 | PC |
| 1-3(Comp.) | 3.0 | 3.5 | Silica | 0.03 | TiO$_2$ | 2.76 | a | 59.1 | 23.1 | PC |
| 1-4(Comp.) | 3.0 | 0.2 | Silica | 0.01 | Silica | 1.46 | a | 138.9 | 84.5 | PC |
| 1-5(Comp.) | 3.0 | 3.5 | Silica | — | — | — | — | 63.5 | 26.4 | PC |

*a: Hydrophilic b: Hydrophobic

As can be seen from Table 1, inventive samples 1-1 to 1-4 in which fine particles having a refractive index of 1.40 to 1.60 are incorporated, were markedly superior in transmission visibility, as compared to comparative sample 1-5 in which fine particles were not incorporated and sample 1-3 in which fine titanium oxide particles having a refractive index of more than 1.60. Further, from comparison of inventive samples 1-1 to 1-4, fine silica particles were shown to be preferable than fine polymethyl methacrylate (PMMA) particles, with respect to transmission visibility. Regarding the average particle size of the fine particles, inventive sample 1-1 of 0.01 μm or less was shown to be markedly superior in transmission visibility to comparative sample 1-1 of 0.25 μm. From comparison of inventive samples 1-1, 1-7 and comparative sample 1-4 with respect to glossiness and transmission visibility, the average particle size is shown to be preferable with a range of 0.25 to 10 μm. Furthermore, from comparison of inventive samples 1-1 and 1-5 with respect to transmission visibility, silica particles were shown to be more preferable than PMMA particles.

Example 2
Preparation of Inventive Sample 2-1

Using the polycarbonate film with a thickness of 80 mm used in sample 1-1 of example 1, UV ray-hardenable resin composition D was coated on the b-side of the film so as to have a dry thickness of 0.3 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m$^2$ and dried at 100° C. for 5 min. to obtain an inventive sample 2-1.

Preparation of Inventive Sample 2-2

Using the polycarbonate film with a thickness of 80 mm used in sample 1-1 of example 1, UV ray-hardenable resin composition E was coated on the b-side of the film so as to have a dry thickness of 0.5 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m$^2$ and dried at 100° C. for 5 min. to obtain an inventive sample 2-2.

Preparation of Inventive Sample 2-3

Using the polycarbonate film with a thickness of 80 mm used in sample 1-1 of example 1, UV ray-hardenable resin composition F was coated on the b-side of the film so as to have a dry thickness of 2.5 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m$^2$ and dried at 100° C. for 5 min. to obtain an inventive sample 2-3.

Preparation of Inventive Sample 2-4

Inventive sample 2-4 was prepared in the same manner as inventive sample 2-3, except that 2 parts by weight of silica (average particle size of 1.0 μm) of UV ray-hardenable resin F was replaced by 2 parts by weight of silica (average particle size of 1.38 μm).

Preparation of Inventive Sample 2-5

Inventive sample 2-5 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and 2 parts by weight of hydrophilic silica (average particle size of 0.01 μm) was replaced by 2 parts by weight of hydrophilic silica (average particle size of 0.005 μm).

Preparation of Inventive Sample 2-6

Inventive sample 2-6 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and 2 parts by weight of hydrophilic silica (average particle size of 0.01 μm) was replaced by 1 parts by weight of hydrophilic silica (average particle size of 0.005 μm).

Preparation of Inventive Sample 2-7

Inventive sample 2-7 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm).

Preparation of Inventive Sample 2-8

Inventive sample 2-8 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and 2 parts by weight of hydrophilic silica (average particle size of 0.01 μm) was replaced by 1 part by weight of hydrophobic silica (average particle size of 0.01 μm).

Preparation of Inventive Sample 2-9

Inventive sample 2-9 was prepared in the same manner as inventive sample 2-3, except that 2 parts by weight of silica (average particle size of 1.0 μm) of UV ray-hardenable resin F was replaced by 1 parts by weight of silica (average particle size of 1.88 μm).

Preparation of Inventive Sample 2-10

Inventive sample 2-10 was prepared in the same manner as inventive sample 2-3, except that 2 parts by weight of silica (average particle size of 1.0 μm) of UV ray-hardenable resin F was replaced by 4 parts by weight of silica (average particle size of 1.88 μm).

Preparation of Inventive Sample 2-11

Inventive sample 2-11 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and 2 parts by weight of hydrophilic silica (average particle size of 0.01 μm) was replaced by 2 parts by weight of hydrophilic silica (average particle size of 0.08 μm).

Preparation of Inventive Sample 2-12

Inventive sample 2-10 was prepared in the same manner as inventive sample 2-3, except that 2 parts by weight of silica (average particle size of 1.0 μm) of UV ray-hardenable resin F was replaced by 2 parts by weight of silica (average particle size of 2.5 μm).

Preparation of Inventive Sample 2-13

Inventive sample 2-13 was prepared in the same manner as inventive sample 2-3, except that 2 parts by weight of silica (average particle size of 1.0 μm) of UV ray-hardenable resin F was replaced by 2 parts by weight of silica (average particle size of 3.75 μm).

Preparation of Inventive Sample 2-14

Using the polycarbonate film with a thickness of 80 mm used in sample 1-1 of example 1, UV ray-hardenable resin composition G was coated on the b-side of the film so as to have a dry thickness of 5.0 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m² and dried at 100° C. for 5 min. to obtain an inventive sample 2-14.

Preparation of Inventive Sample 2-15

Using the polycarbonate film with a thickness of 80 mm used in sample 1-1 of example 1, UV ray-hardenable resin composition H was coated on the b-side of the film so as to have a dry thickness of 6.0 μm and dried at 80° C. for 5 min. Subsequently, the coat was exposed to UV light emitted from a high pressure UV lamp at a distance of 10 cm apart for 4 sec. to form UV-hardened resin layer A. Next, on the a-side, the lower layer solution (1) and upper layer solution (2) of the adhesion-facilitating layer (a) were each coated in this order in a coating amount of 20 ml/m² and dried at 100° C. for 5 min. to obtain an inventive sample 2-15.

Preparation of Inventive Sample 16

Inventive sample 2-16 was prepared in the same manner as inventive sample 2-7, except that cellulose triacetate film with a thickness of 80 μm used in sample 1-6 of example 1 was used and on the a-side thereof, a coating solution of the adhesion-facilitating layer (b) was coated.

Preparation of Comparative Sample 2-1

Comparative sample 2-1 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and 2 parts by weight of hydrophilic silica (average particle size of 0.01 μm) was replaced by 2 parts by weight of hydrophilic silica (average particle size of 0.25 μm).

Preparation of Comparative Sample 2-2

Inventive sample 2-2 was prepared in the same manner as inventive sample 2-3, except that 2 parts by weight of silica (average particle size of 1.0 μm) of UV ray-hardenable resin F was replaced by 2 parts by weight of silica (average particle size of 1.88 μm) and without using 2 parts by weight of hydrophilic silica (average particle size of 0.01 μm), composition I was prepared.

The refractive index of hydrophilic silica fine particles contained in UV ray-hardenable resins of thus-prepared inventive samples 2-1 through 2-16 and comparative samples 2-1 and 2-2 was proved to be 1.45. These samples were each evaluated according to the following manner.

Evaluation of Glare-proof

Samples were evaluated in the same manner as in Example 1. Results thereof are shown in Table 2.

Evaluation of Hardness

Pencil hardness was measured with respect to the UV ray-hardenable resin layer-side of each sample. Measurements were made at a load of 100 g, in accordance with JIS K5401.

Evaluation of Transmission Visibility

Samples were evaluated in the same manner as in Example 1. Results thereof are shown in Table 2.

Evaluation of Sparkle

Using inventive samples 2-1 through 2-16 and comparative samples 2-1 and 2-2 as a protective film of a polarizing plate, polarizing plates were prepared according to the following manner.

(i) Initially, a polarizing membrane was prepared. A polyvinyl alcohol film with a thickness of 120 μm was dipped in an aqueous solution comprised of iodine of 1 part, potassium iodide of 2 parts and boric acid of 4 parts and then stretched by a factor of four at 50° C. to obtain the polarizing membrane.

(ii) A protective film which is cut in a size of 30 cm in a longitudinal direction and 18 cm in width direction, is arranged on a glass plate so that its a-side is upside down.

(iii) The above polarizing membrane at an identical size as the protective film is dipped for 1 to 2 sec in an adhesive-bath containing 2 wt. % polyvinyl alcohol.

(iv) Excess adhesive adhered to the polarizing membrane is carfully wiped off. The polarizing membrane is then placed on the protective film arranged as in (ii) so that the adhesive is brought into contact with the a-side of the protective film.

(v) The polarizing membrane is laminated to the protective film, with manual pressure using a hand-roller to remove any excess adhesive and/or air bubbles. Pressure on the hand-roller is about 2 to 3 kg/cm² at a roller speed of about 2 m/min.

(vi) The resulting sample is allowed to stand for 2 min. in a drying chamber at 80° C.

Each of thus-prepared polarizing plate was built in the surface side of 9.5 inch TFT full color liquid crystal display (picture element no. of 307200, i.e., 640×480 dots; picture element pitch of 0.30×0.30 mm). The indicator of the liquid crystal display was set to "overall white", then, sparkle (abnormal luminance) was visually observed and evaluated based on the following criteria.

A: Not observed level
B: Slightly observed level
C: Observed level

Results thereof are shown in Table 2.

TABLE 2

| Sample No. | Layer thickness (μm) | Coarse particles Av.size (μm) | Coarse particles Amount (wt.parts) | Fine particles Av.size (μm) | Fine particles surface | Fine particles Amount (wt.parts) | Glossiness | Hardness | Sparkle | Transmission visibility |
|---|---|---|---|---|---|---|---|---|---|---|
| 2-1(Inv.) | 0.3 | 0.45 | 2 | 0.01 | a | 2 | 50.3 | 3H | A | 125.1 |
| 2-2(Inv.) | 0.5 | 0.75 | 2 | 0.01 | a | 2 | 51.7 | 5H | A | 121.7 |
| 2-3(Inv.) | 2.5 | 2.0 | 2 | 0.01 | a | 2 | 89.1 | >6H** | A | 110.3 |
| 2-4(Inv.) | 2.5 | 2.75 | 2 | 0.01 | a | 2 | 67.8 | >6H | A | 98.0 |
| 2-5(Inv.) | 2.5 | 3.75 | 2 | 0.005 | a | 2 | 49.0 | >6H | A | 127.1 |
| 2-6(Inv.) | 2.5 | 3.75 | 2 | 0.01 | a | 1 | 49.3 | >6H | A | 110.2 |
| 2-7(Inv.) | 2.5 | 3.75 | 2 | 0.01 | a | 2 | 48.2 | >6H | A | 128.4 |
| 2-8(Inv.) | 2.5 | 3.75 | 2 | 0.01 | a | 2 | 49.4 | >6H | A | 82.5 |
| 2-9(Inv.) | 2.5 | 3.75 | 1 | 0.01 | b | 2 | 68.6 | >6H | A | 138.2 |
| 2-10(Inv.) | 2.5 | 3.75 | 4 | 0.01 | a | 2 | 33.0 | >6H | A | 96.4 |
| 2-11(Inv.) | 2.5 | 3.75 | 2 | 0.08 | a | 2 | 47.1 | >6H | A | 110.3 |
| 2-12(Inv.) | 2.5 | 5.0 | 2 | 0.01 | a | 2 | 38.8 | >6H | A | 92.1 |
| 2-13(Inv.) | 2.5 | 7.5 | 2 | 0.01 | a | 2 | 32.5 | >6H | B | 78.0 |
| 2-14(Inv.) | 5.0 | 7.5 | 2 | 0.01 | a | 2 | 49.9 | >6H | A | 92.5 |
| 2-15(Inv.) | 6.0 | 9.0 | 2 | 0.01 | a | 2 | 50.0 | >6H | B | 85.2 |
| 2-16(Inv.) | 2.5 | 3.75 | 2 | 0.01 | a | 2 | 48.4 | >6H | A | 127.5 |
| 2-1(Comp.) | 2.5 | 3.75 | 2 | 0.25 | a | 2 | 45.3 | >6H | B | 29.7 |
| 2-2(Comp.) | 2.5 | 3.75 | 2 | — | — | — | 50.3 | >6H | B | 30.8 |

*a: Hydrophilic b: Hydrophobic
**more than 6H

As can be seen from Table 2, it was shown as follows. From comparison of inventive samples 2-7 and 2-8, hydrophilic fine particles was shown to be superior in transmission visibility to hydrophobic ones. As to the average particle size of fine particles, that of 0.1 μm or less was markedly superior in transmission visibility (inventive sample 2-11 vs. comparative sample 2-1). Further, the average fine particle size of 0.015 μm or less is more preferred (inventive samples 2-7 and 11). Furthermore, addition of the fine particles led to marked improvements in transmission visibility, as shown from comparison of inventive samples 2-7 and 11 with comparative sample 2.

As to the thickness of the glare-proof layer 10, the range of 0.5 to 5.0 μm is preferred and 2.0 to 4.0 μm is more preferred, as shown from results of regarding pencil hardness and sparkle of inventive samples 2-1, 2, 7, 14 and 15. The average size of the particles (i.e., the first particles, as claimed) was preferably 1.1 to 2.0 and more preferably not less than 1.5 times the layer thickness., as shown from results regarding glossiness and sparkle of inventive samples 2-3, 4, 7, 12 and 13. The addition amount of the particles was preferably 2 parts by weight or less of the binder, as shown from results regarding glossiness of inventive samples 2-7, 9 and 10.

What is claimed is:

1. A protective film for use with a polarizing plate comprising a support having on one side thereof a glare-proof layer, wherein said glare-proof layer comprises coarse particles having an average particle size of 0.25 to 10 μm and fine particles having an average particle size no greater than 0.1 μm and a refractive index of 1.40 to 1.60, and wherein said fine particles are hydrophilic particles having a moisture content no less than 0.5% by weight.

2. The protective film of claim 1, wherein said coarse particles and said fine particles independently are comprised of one selected from the group consisting of silicon oxide, titanium oxide, aluminium oxide, zinc oxide, tin oxide, calcium carbonate, barium sulfate, talc, kaolin, and calcium sulfate.

3. The protective film of claim 2, wherein said coarse particles and fine particles are comprised of silicon oxide.

4. The protective film of claim 1, wherein said coarse particles and said fine particles independently are comprised of one selected from the group consisting of a polyacrylate, polymethacrylate, silicone resin, polystyrene, polycarbonate, polyacryl-styrene, benzoguanamine type resin, melamine type resin, polyolefin resin, polyester resin, polyamide, polyimide, and polyfluoroethylene.

5. The protective film of claim 1, wherein said glare-proof layer is a hardened layer being obtained by hardening a layer containing a resin capable of being hardened upon exposure to actinic ray.

6. The protective film of claim 5, wherein said resin is selected from the group consisting of an ultraviolet ray hardenable resin and an electron beam hardenable resin.

7. The protective film of claim 1, wherein a adhesion-facilitating layer is provided on the other side of the support opposite to the glare-proof layer.

8. A polarizing plate comprising a polarizing film containing a polarizer and provided thereon a protective film which comprises a support having thereon a glare-proof layer, wherein said glare-proof layer comprises coarse particles having an average particle size of 0.25 to 10 μm, and fine particles having an average particle size no greater than 0.1 μm and a refractive index of 1.40 to 1.60, and wherein said fine particles are hydrophilic particles having a moisture content no less than 0.5% by weight.

9. The polarizing plate of claim 8, wherein said coarse particles and said fine particles independently are comprised of one selected from the group consisting of silicon oxide, titanium oxide, aluminium oxide, zinc oxide, tin oxide, calcium carbonate, barium sulfate, talc, kaolin, and calcium sulfate.

10. The polarizing plate of claim 9, wherein said coarse particles and fine particles are comprised of silicon oxide.

11. The polarizing plate of claim 8, wherein said coarse particles and said fine particles independently are comprised of one selected from the group consisting of a polyacrylate, polymethacrylate, silicone resin, polystyrene, polycarbonate, polyacryl-styrene, benzoguanamine type resin, melamine type resin, polyolefin resin, polyester resin, polyamide, polyimide, and polyfluoroethylene.

12. The polarizing plate of claim 8, wherein said glare-proof layer is a hardened layer being obtained by hardening a layer containing a resin capable of being hardened upon exposure to actinic ray.

13. The polarizing plate of claim 12, wherein said resin is selected from the group consisting of an ultraviolet ray hardenable resin and an electron beam hardenable resin.

14. A protective film for use with a polarizing plate comprising a support having on one side thereof a glare-proof layer, wherein said glare-proof layer comprises coarse particles having an average particle size of 0.25 to 10 μm and fine particles having an average particle size which is 0.005 to 0.1 μm and a refractive index of 1.40 to 1.60, and wherein said glare-proof layer has a thickness of 0.5 to 5.0 μm and the average particle size of said coarse particles is 1.1 to 2 times the thickness of said glare-proof layer.

15. The protective film of claim 14, wherein said coarse particles and fine particles are comprised of silicon oxide.

16. A polarizing plate comprising a polarizing film containing a polarizer and provided thereon a protective film which comprises a support having thereon a glare-proof layer, wherein said glare-proof layer comprises coarse particles having an average particle size of 0.25 to 10 μm and fine particles having an average particle size which is 0.005 to 0.1 μm and a refractive index of 1.40 to 1.60, and wherein said glare-proof layer has a thickness of 0.5 to 5.0 μm and the average particle size of said coarse particles is 1.1 to 2 times the thickness of said glare-proof layer.

17. The polarizing plate of claim 16, wherein said coarse particles and fine particles are comprised of silicon oxide.

* * * * *